United States Patent
Gandhi et al.

(10) Patent No.: US 9,613,198 B2
(45) Date of Patent: Apr. 4, 2017

(54) APPARATUS AND METHOD FOR INTELLIGENT VIDEO SURVEILLANCE OF INDUSTRIAL CONSOLE OPERATIONS

(71) Applicant: Honeywell International Inc., Morristown, NJ (US)

(72) Inventors: Amol Gandhi, Bangalore (IN); Rohan McAdam, Yetholme (AU)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/673,405

(22) Filed: Mar. 30, 2015

(65) Prior Publication Data

US 2016/0292406 A1   Oct. 6, 2016

(51) Int. Cl.
G06K 5/00 (2006.01)
G06F 21/32 (2013.01)
G06K 9/00 (2006.01)

(52) U.S. Cl.
CPC .......... *G06F 21/32* (2013.01); *G06K 9/00288* (2013.01)

(58) Field of Classification Search
CPC ............ G06K 9/00221; G06K 9/00228; G06F 17/30032
USPC ...................... 235/375, 382, 382.5
See application file for complete search history.

(56) References Cited

U.S. PATENT DOCUMENTS

| 6,381,502 B1* | 4/2002 | Rudder | G05B 19/4185 |
| | | | 700/17 |
| 6,724,919 B1 | 4/2004 | Akiyama et al. | |
| 6,963,659 B2* | 11/2005 | Tumey | G06K 9/6857 |
| | | | 340/5.2 |
| 7,114,079 B1* | 9/2006 | Cook | G06K 9/00281 |
| | | | 340/5.52 |
| 7,314,167 B1* | 1/2008 | Kiliccote | G06Q 20/04 |
| | | | 235/380 |

(Continued)

FOREIGN PATENT DOCUMENTS

JP   2008-181293   8/2008

OTHER PUBLICATIONS

Notification of the Transmittal of International Search Report and the Written Opinion of the International Searching Authority, or the Declaration dated Jun. 27, 2016, 12 pages.

*Primary Examiner* — Paultep Savusdiphol

(57) ABSTRACT

A method implemented in an operator console includes receiving a captured image of an operator at the operator console. The method also includes identifying whether the operator captured in the image is authorized to use the operator console. The method further includes performing a function based on whether the operator is authorized to use the operator console. A non-transitory computer-readable medium comprising one or more executable instructions that, when executed by processing circuitry, cause the processing circuitry to receive a captured image from a camera including an image of an operator at the operator console. The non-transitory computer-readable medium comprises one or more executable instruction that, when executed by processing circuitry, also cause the processing circuitry to identify whether the operator captured in the image is authorized to use the operator console and perform a function based on whether the operator is authorized to use the operator console.

20 Claims, 5 Drawing Sheets

(56) References Cited

U.S. PATENT DOCUMENTS

| | | | |
|---|---|---|---|
| 7,660,444 B2 * | 2/2010 | Hamalainen | G06F 21/32 382/118 |
| 8,209,752 B2 * | 6/2012 | Ohta | G07C 9/00158 713/186 |
| 8,261,090 B1 * | 9/2012 | Matsuoka | G06F 21/32 382/115 |
| 8,364,971 B2 * | 1/2013 | Bell | G06F 21/32 382/117 |
| 8,396,265 B1 * | 3/2013 | Ross | G06K 9/00214 382/103 |
| 8,457,367 B1 * | 6/2013 | Sipe | G06K 9/00221 382/118 |
| 8,515,139 B1 * | 8/2013 | Nechyba | G06K 9/6256 382/115 |
| 8,542,879 B1 * | 9/2013 | Nechyba | G06K 9/00228 382/103 |
| 8,611,616 B1 * | 12/2013 | Ross | G06K 9/00214 382/103 |
| 8,677,132 B1 * | 3/2014 | Liao | H04L 9/0888 713/176 |
| 8,752,145 B1 * | 6/2014 | Dotan | G06F 21/00 340/5.2 |
| 8,798,336 B2 * | 8/2014 | Nechyba | G06K 9/00228 382/118 |
| 8,832,778 B2 * | 9/2014 | McCune | G06F 21/85 726/1 |
| 8,984,622 B1 * | 3/2015 | Baldwin | G06K 9/00228 726/16 |
| 8,994,499 B2 * | 3/2015 | Zhao | G06F 21/32 340/5.53 |
| 9,082,235 B2 * | 7/2015 | Lau | G07C 9/00 |
| 9,117,109 B2 * | 8/2015 | Nechyba | G06K 9/00228 |
| 9,158,904 B1 * | 10/2015 | Ross | G06K 9/00214 |
| 9,202,105 B1 * | 12/2015 | Wang | G06Q 20/4014 |
| 2002/0034319 A1 * | 3/2002 | Tumey | G06K 9/00087 382/116 |
| 2004/0218070 A1 * | 11/2004 | Hamalainen | G06F 21/32 348/239 |
| 2006/0080419 A1 * | 4/2006 | Patrick | H04L 41/082 709/220 |
| 2009/0258667 A1 * | 10/2009 | Suzuki | B66B 1/46 455/550.1 |
| 2010/0107242 A1 * | 4/2010 | Ohta | G07C 9/00158 726/19 |
| 2012/0235790 A1 * | 9/2012 | Zhao | G06F 21/32 340/5.83 |
| 2013/0015946 A1 * | 1/2013 | Lau | G07C 9/00 340/5.2 |
| 2013/0063581 A1 * | 3/2013 | Komatsu | G06K 9/00926 348/77 |
| 2013/0339050 A1 * | 12/2013 | Moeller | G06Q 50/24 705/3 |
| 2014/0015930 A1 * | 1/2014 | Sengupta | G06K 9/00771 348/46 |
| 2014/0016837 A1 * | 1/2014 | Nechyba | G06K 9/00228 382/118 |
| 2014/0289834 A1 | 9/2014 | Lindemann | |
| 2014/0307929 A1 * | 10/2014 | Nechyba | G06K 9/00228 382/118 |
| 2015/0063661 A1 | 3/2015 | Lee et al. | |
| 2015/0154446 A1 * | 6/2015 | Masood | G06K 9/00221 382/117 |
| 2015/0186711 A1 * | 7/2015 | Baldwin | G06K 9/00228 382/118 |
| 2015/0193611 A1 * | 7/2015 | Zhao | G06F 21/32 726/19 |

\* cited by examiner

APPARATUS AND METHOD FOR INTELLIGENT VIDEO SURVEILLANCE OF INDUSTRIAL CONSOLE OPERATIONS

TECHNICAL FIELD

This disclosure relates generally to industrial process control and automation systems. More specifically, this disclosure relates to an apparatus and method for intelligent video surveillance of industrial console operations.

BACKGROUND

Industrial process control and automation systems are often used to automate large and complex industrial processes. These types of control and automation systems routinely include sensors, actuators, and controllers. The controllers typically receive measurements from the sensors and generate control signals for the actuators.

These types of control and automation systems also typically include numerous operator consoles. Operator consoles are often used to receive inputs from operators, such as setpoints for process variables in an industrial process being controlled. Operator consoles are also often used to provide outputs to operators, such as to display warnings, alarms, or other information associated with the industrial process being controlled. Large collections of operator consoles are often used in control rooms where a number of operators assemble and work.

SUMMARY

This disclosure provides an apparatus and method for combining visualization and interaction in industrial operator consoles.

In a first embodiment, a method implemented in an operator console is provided. The method includes receiving a captured image of an operator at the operator console. The method also includes identifying whether the operator captured in the image is authorized to use the operator console. The method further includes performing a function based on whether the operator is authorized to use the operator console.

In a second embodiment, an operator console is provided. The operator console includes one or more cameras configured to capture an image of an operator at the operator console. The operator console also includes an image verification unit. The image verification unit is configured to identify whether the operator captured in the image is authorized to use the operator console. The image verification unit is also configured to perform a function based on whether the operator is authorized to use the operator console.

In a third embodiment, a non-transitory computer-readable medium is provided. The non-transitory computer-readable medium comprises one or more executable instruction that, when executed by processing circuitry, cause the processing circuitry to receive a captured image from a camera. The captured image includes an image of an operator at the operator console. The non-transitory computer-readable medium comprises one or more executable instruction that, when executed by processing circuitry, also cause the processing circuitry to identify whether the operator captured in the image is authorized to use the operator console. The non-transitory computer-readable medium comprises one or more executable instruction that, when executed by processing circuitry, further cause the processing circuitry to perform a function based on whether the operator is authorized to use the operator console.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Control rooms or control centers are often key areas for controlling plant operations. Control rooms or centers allow operators to continuously monitor and control plant processes for safe and efficient plant operations. Plants often operate 24 hours a day, 7 days a week, and 365 days a year. Maintaining best-in-class plant operations and around-the-clock operator alertness (along with appropriate security and logging measures) are some key challenges of current operator consoles.

Control rooms or control center security can be enhanced by checking whether a person who changes a password or other login credentials from one authorization level to another is an actual authorized person. If an unauthorized person obtains system login credentials, that person could potentially log into a plant system and perform operations that result in accidents or other major losses. Even during normal operations, operators often need to maintain situational awareness during lull periods or periods of boredom so that an adequate level of attention is provided and appropriate actions are performed to ensure safe and efficient plant operations.

Among other things, this disclosure provides detection mechanisms to ensure that only authorized persons are doing assigned or intended operations. This disclosure also provides for appropriate event logging, history tracking, and emergency alert mechanisms. The proposed concepts of this disclosure can be added as additional hardware, software, or firmware component(s) to existing operator consoles or stations. For example, the concepts of this disclosure can be integrated into existing operator console hardware as well as human machine interface (HMI) software. The proposed concepts further include a unique hybrid approach supporting security alertness as well as process knowledge-based alertness. The proposed concepts improve physical security and access integrity of operations, analyze trends related to operator fatigue, and provide better safety compliance.

Figure 1:
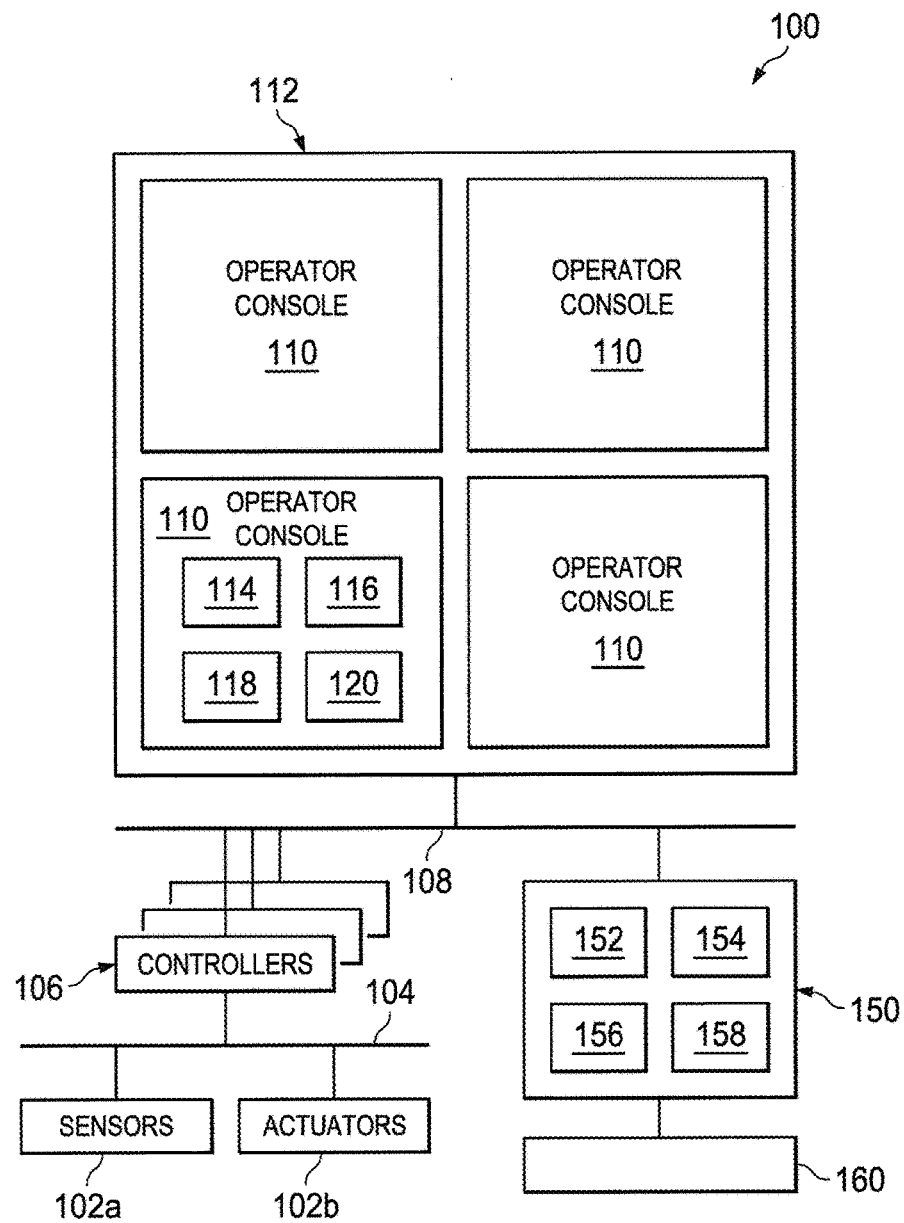
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

Various controllers 106 are coupled directly or indirectly to the network 104. The controllers 106 can be used in the system 100 to perform various functions. For example, a first set of controllers 106 may use measurements from one or more sensors 102a to control the operation of one or more actuators 102b. A second set of controllers 106 could be used to optimize the control logic or other operations performed by the first set of controllers 106. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent multivariable controllers, such as Robust Multivariable Predictive Control Technology (RMPCT) controllers or other types of controllers implementing model predictive control (MPC) or other advanced predictive control (APC).

Operator access to and interaction with the controllers 106 and other components of the system 100 can occur via various operator consoles 110. As described above, each operator console 110 could be used to provide information to an operator and receive information from an operator. For example, each operator console 110 could provide information identifying a current state of an industrial process to the operator, including warnings, alarms, or other states associated with the industrial process. Each operator console 110 could also receive information affecting how the industrial process is controlled, such as by receiving setpoints for process variables controlled by the controllers 106 or by receiving other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

Each operator console 110 also includes one or more cameras 120. Each camera 120 captures an image of an operator for operator authorization when the operator is utilizing the operator console 110. When an operator is performing normal operations at an operator console 110, the camera 120 captures images of the operator at predetermined or random time intervals to verify authorization of input commands. For example, the camera 120 captures images of an operator at an operator console 110 at predetermined or random intervals. The camera 120 transmits the captured image to the image verification unit 150. The image verification unit 150 utilizes a processor or processing circuitry 152 to match the captured image of the operator with an authorized image stored in the memory 154. Based on matching the captured image of the operator with the authorized image, the image verification unit 150 permits access to sensors 102a and actuators 102b, for example, until the next captured image is taken and evaluated for operator authorization.

In an embodiment, after the camera 120 transmits the captured image to the image verification unit 150, the image verification unit 150 attempts to match the captured image of the operator with an authorized image stored in the memory 154 using the processor 152. However, the image verification unit 150 may be unable to locate a matching authorized image in the memory 154 rendering the captured image an unauthorized captured image. In this case, the processor 152 activates an alarm activation unit 156 to sound one or more alarms or alert another operator console 110 of the failed match. Furthermore, the processor 152 stores the failed match in a data store 158. For example, the processor 152 stores a time that the unauthorized captured image was captured, an identification of particular sensors 102a and actuators 102b commanded that correlate with the time the unauthorized captured image was captured, an identification of command initiating actuators 102*b* or any readings taken of sensors 102*a* that correlate with the time that the unauthorized captured image was captured, or the like. In an embodiment, in response to determining that the captured image is an unauthorized captured image, the processor 152 locks the operator console 110 from further use. In another embodiment, in response to determining that the captured image is an unauthorized captured image, the processor 152 would deny the initiation of the command or action, but would continue to permit operation of the operator console 110.

When an operator is performing normal operations at an operator console 110, the camera 120 captures images of the operator in response to receiving commands to read the sensors 102*a* or actuate the actuators 102*b* to verify that the operator is authorized to read the sensors 102*a* or actuate the actuators 102*b*. For example, the camera 120 captures images of an operator at an operator console 110 in response to receiving a command to read the sensors 102*a* or actuate the actuators 102*b* of a particular security or authorization level. The camera 120 transmits the captured image to the image verification unit 150. The image verification unit 150 utilizes a processor or processing circuitry 152 to match the operator captured image with the particular security or authorization level needed to transmit a command to read the sensors 102*a* or actuate the actuators 102*b* of the particular security or authorization level. Based on matching the captured image of the operator with the particular security level, the image verification unit 150 permits access to sensors 102*a* and actuators 102*b* of the particular security level through the operator console 110.

In an embodiment, after the camera 120 transmits the captured image to the image verification unit 150, the image verification unit 150 attempts to match the captured image of the operator with the particular security level. However, the image verification unit 150 may be unable to authorize the operator captured in the image to command the sensors 102*a* and actuators 102*b* of the particular security level, thus rendering the captured image of the operator an unauthorized captured image. In this case, the processor 152 may activate an alarm activation unit 156 to sound one or more alarms or alert another operator console 110 of the failed authorization. Furthermore, the processor 152 stores the failed authorization in a data store 158. For example, the processor 152 stores a time that the unauthorized captured image was captured, an identification of the particular sensors 102*a* and actuators 102*b* commanded by the operator captured in the unauthorized capture image, particular commands sent to the sensors 102*a* or the actuators 102*b*, or the like. In an embodiment, in response to determining that the captured image is an unauthorized captured image, the processor 152 locks the operator console 110 from further use or simply denies the operator the ability to command the sensors 102*a* or actuators 102*b* of the particular security level or higher.

The camera 120 also captures an image of the operator at the operator console 110 when the operator provides login credentials (such as a username and password) to the operator console 110 to gain access to one or more sensors 102*a* or actuators 102*b* using the operator console 110. For example, when an operator provides login credentials to the operator console 110, the camera 120 captures an image of the operator providing the login credentials. The camera 120 transmits the captured image to the image verification unit 150. The image verification unit 150 utilizes a processor or processing circuitry 152 to match the captured image of the operator with an authorized image stored in the memory 154. Based on matching the captured image of the operator with an authorized image, the image verification unit 150 permits access to sensors 102*a* and actuators 102*b* through the operator console 110.

After the camera 120 transmits the captured image to the image verification unit 150, the image verification unit 150 attempts to match the captured image of the operator with an authorized image stored in the memory 154 using the processor 152. However, the image verification unit 150 may be unable to locate an authorized image in the memory 154 that matches the operator captured in the image, thus rendering the captured image an unauthorized captured image. In this case, the processor 152 activates the alarm activation unit 156 to sound one or more alarms or alert another operator console 110 of the failed match. Furthermore, the processor 152 stores the failed match in a data store 158. For example, the processor 152 stores the time the unauthorized captured image was taken, the login credentials used to attempt to access the operator console 110 that correlate with the unauthorized captured image, or the like. In an embodiment, in response to determining that the captured image is an unauthorized captured image, the processor 152 locks the operator console 110 from further use.

In an embodiment, when an operator provides login credentials to the operator console 110, the camera 120 captures an image of the operator providing the login credentials. The camera 120 transmits the captured image to the image verification unit 150. The image verification unit 150 utilizes a processor or processing circuitry 152 to match the captured image of the operator with the login credentials provided by the operator captured in the image. Based on matching the captured image of the operator with the provided login credentials (or an authorized stored image associated with the login credentials), the image verification unit 150 permits access to sensors 102*a* and actuators 102*b* through the operator console 110. The image verification unit 150 can permit access to sensors 102*a* and actuators 102*b* after matching the captured image of the operator with the provided login credential and after matching the capture image of the operator with an authorized image stored in the memory 154.

After the camera 120 transmits the captured image to the image verification unit 150, the image verification unit 150 attempts to match the captured image of the operator with an authorized image (or an image of an authorized operator) associated with the provided login credentials using the processor 152. However, the image verification unit 150 may be unable to locate an authorized image associated with the login credentials in the memory 154 that matches the operator captured in the image, thus rendering the captured image an unauthorized captured image. In this case, the processor 152 activates the alarm activation unit 156 to sound one or more alarms or alert another operator console 110 of the failed match. Furthermore, the processor 152 stores the failed match in a data store 158. For example, the processor 152 stores the time the unauthorized captured image was taken, the login credentials used to attempt to access the operator console 110 that correlate with the unauthorized captured image, or the like. In an embodiment, in response to determining that the captured image is an unauthorized captured image, the processor 152 locks the operator console 110 from further use.

In an embodiment, in response to determining that an image of an operator captured in an image at the operator console 110 does not match an authorized image, the processor 152 can identify and notify another operator console 110 (such as an operator console used to supervise a plurality of operator consoles) that can access the same sensors 102a and actuators 102b that the operator console 110 with the mismatch can access. The notification can also provide the other operator console 110 with information related to the location of the operator console 110 with the mismatch, the time the unauthorized image was captured, a copy of the unauthorized image, and any initiated commands or readings that are associated with the unauthorized image. This allows an operator at the other operator console 110 to identify the location of the operator console 110 associated with the unauthorized image, override any initiated commands as needed, and in some cases lock the operator console 110 associated with the unauthorized image.

As disclosed herein, the alarm activation unit 156 can transmit an alarm based on a captured unauthorized image. The alarm activation unit 156 sounds one or more alai ins or alerts another operator console 110 of a failed match. The alarm activation unit 156 can sound one or more alarms through an alarm annunciation unit 160 for better and more effective operator response. The alarm activation unit 156 can sound alarms of different levels. For example, the level of security access that was attempted and denied can determine whether an alarm is sent to merely another operator console 110, a higher manager, or a sound alarm throughout a facility, or the like. The particular sensors 102a or actuators 102b can also determine whether an alarm is sent to another operator console 110, a higher manager, a sound alarm throughout the facility, or a particular manager or department associated with the particular sensors 102a or actuator 102b, or the like. The alarm activation unit 156 can also sound an alarm after a number of consecutive unauthorized login credentials are provided (such as failed login attempts). The alarm activation unit 156 can also escalate an alarm previously sent to a lower level manager or another operator console 110 to a higher level manager after a predetermined time. For example, if a predetermined time passes after the alarm activation unit 156 transmits an alarm to another operator console 110 without receiving a verification that the other operator console 110 has received and acknowledge the alarm, the alarm activation unit 156 can transmit the alarm to a manager or a higher level manager.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which touchscreens can be incorporated or used with operator consoles. FIG. 1 does not limit this disclosure to any particular configuration or operational environment.

Figure 2:
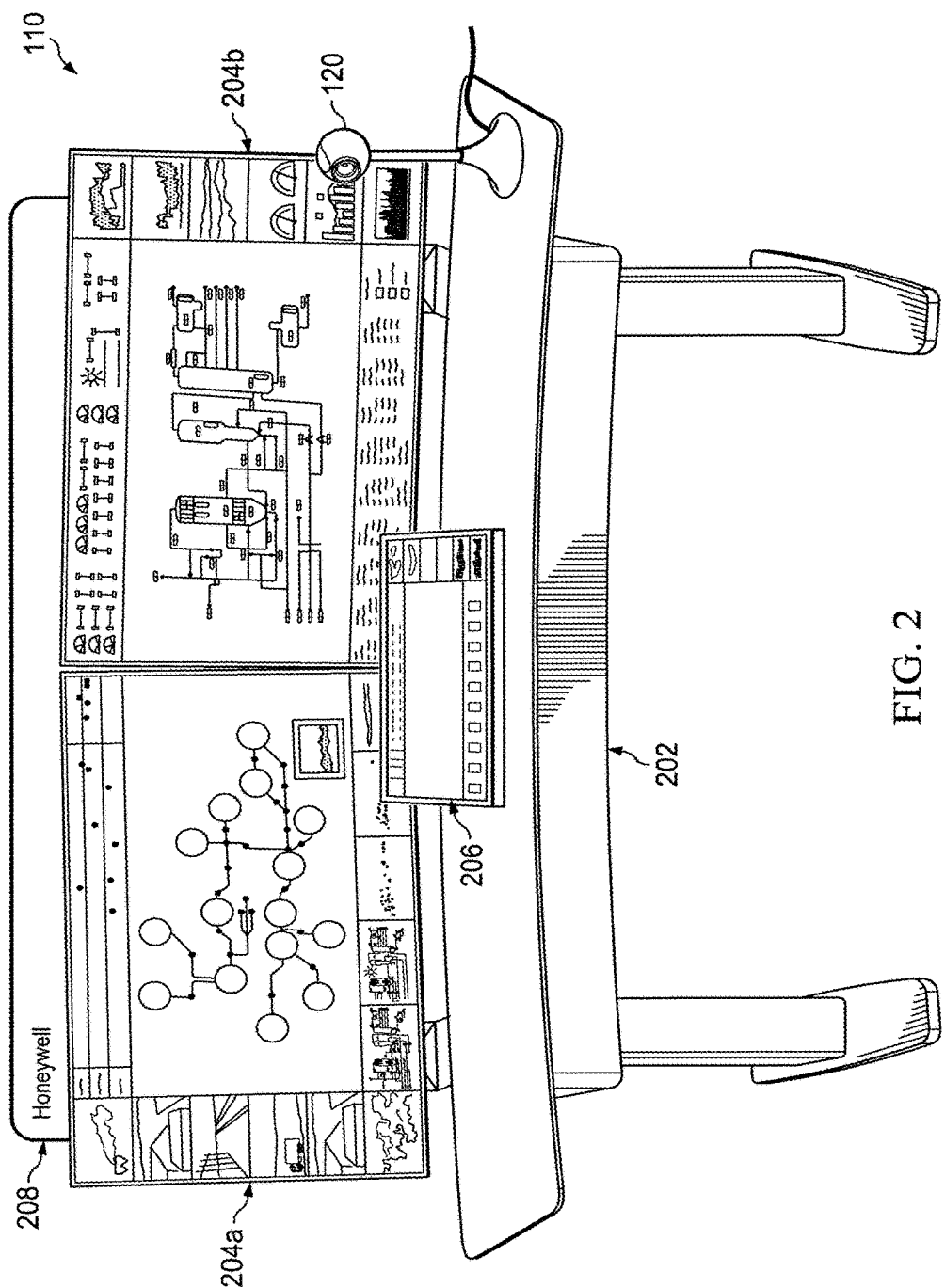
FIGS. 2 through 4 illustrate example operator consoles and related details according to this disclosure.
Figure 3:
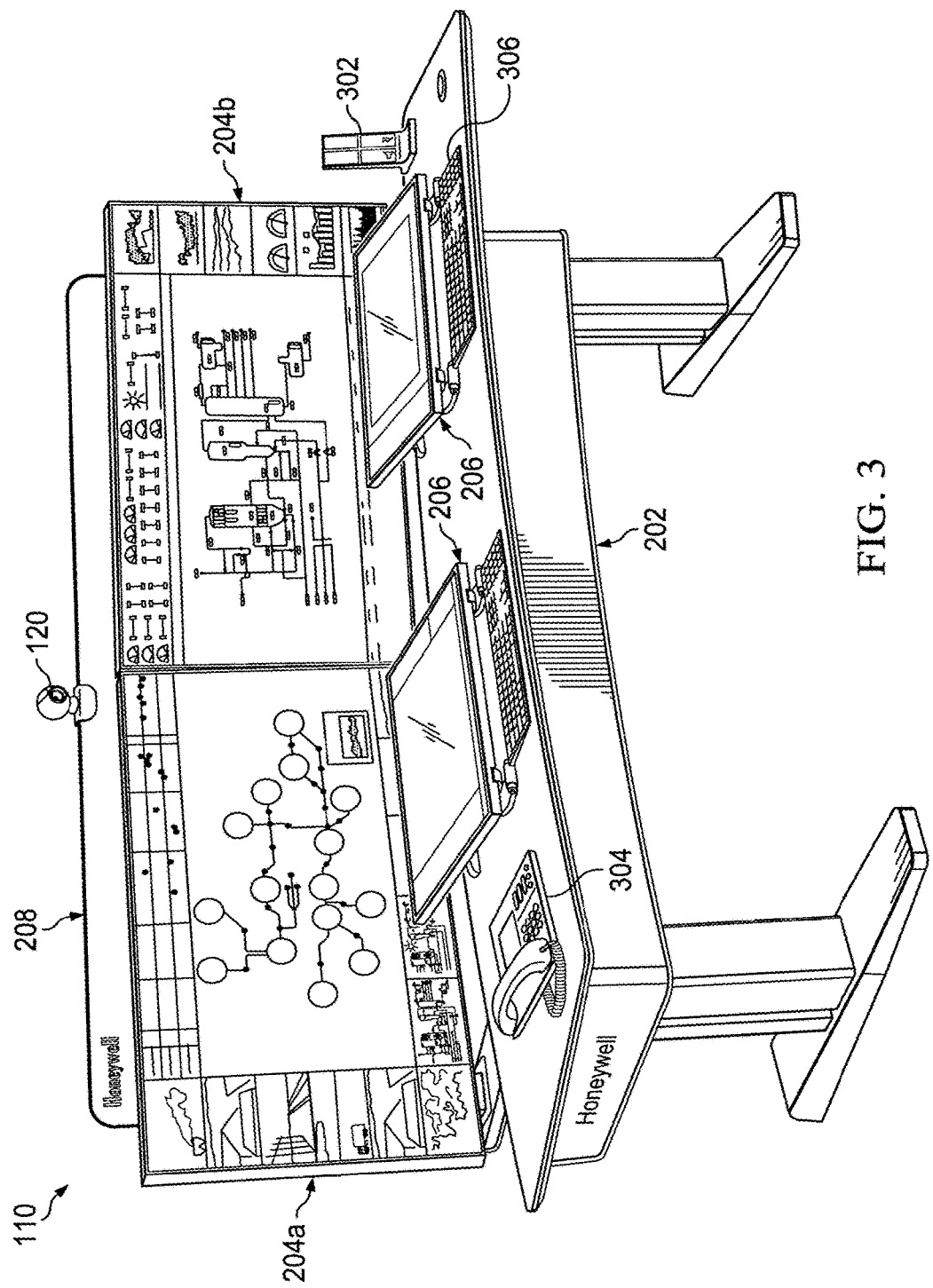
Figure 4:
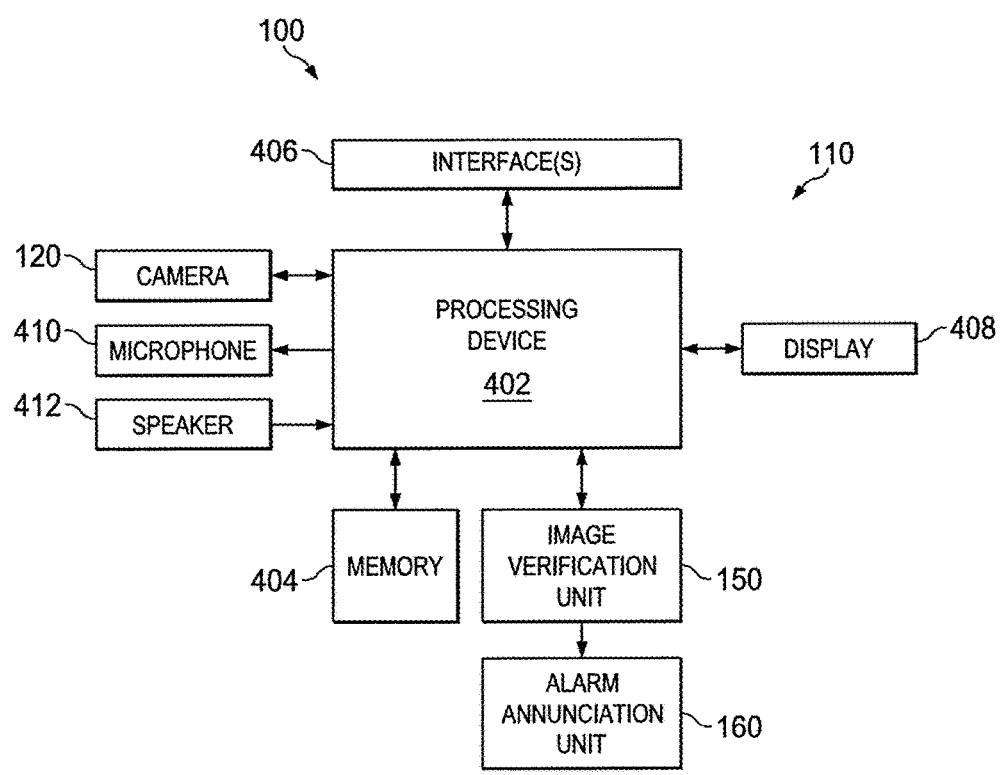

FIGS. 2 through 4 illustrate example operator consoles 110 and related details according to this disclosure. As shown in FIG. 2, one example of the operator console 110 is positioned on a desk 202. The desk 202 supports components of the operator console 110 and could be used to hold or retain electronics under the operator console 110.

The operator console 110 includes one or more display screens 204a-204b placed on, mounted to, or otherwise associated with the desk 202. The display screens 204a-204b can be used to present various information to an operator. For instance, the display screens 204a-204b could be used to present a human-machine interface (HMI) display that includes diagrams of an industrial process being controlled and information associated with the current state of the industrial process being controlled. The HMI display could also be used to receive information from an operator. Each display screen 204a-204b includes any suitable display device, such as a liquid crystal display (LCD) device or a light emitting diode (LED) display device. In this example, there are two display screens 204a-204b adjacent to and angled with respect to one another. However, an operator console 110 could include any number of display screens in any suitable arrangement.

The operator console 110 in this example also includes a touchscreen 206. The touchscreen 206 here is placed on the desk 202 and can be positioned at an angle, such as about 15° to about 35°. The angle of the touchscreen 206 could be adjustable. The touchscreen 206 can be used to interact with the HMI displays presented on the display screens 204a-204b and to control the content on the display screens 204a-204b. The touchscreen 206 could also display additional HMI displays and other information not presented on the display screens 204a-204b. The touchscreen 206 includes any suitable display device with touch sensitivity, such as an LCD or LED touchscreen.

The operator console 110 further includes an ambient display 208, which in this example is positioned at the top of the display screens 204a-204b. The ambient display 208 can output light having different characteristic(s) to identify the current status of an industrial process (or portion thereof) being monitored or controlled using the operator console 110. For example, the ambient display 208 could output green light or no light when the current status of an industrial process or portion thereof is normal. The ambient display 208 could output yellow light when the current status of an industrial process or portion thereof indicates that a warning has been issued. The ambient display 208 could output red light when the current status of an industrial process or portion thereof indicates that an alarm has been issued. Note that other or additional characteristics of the ambient light can also be controlled, such as the intensity of light or the speed of transitions in the light. The ambient display 208 here represents an edge-lit glass segment or other clear segment, where one or more edges of the segment can be illuminated using an LED strip or other light source. Note, however, that the use of the ambient display 208 is optional.

The operator console 110 also includes one or more cameras 120 as disclosed herein. The one or more cameras can be embedded with the display screens 204a-204b, attached to a side or top of the display screens 204a-204b, placed on the desk 202, or on a stand next to the desk 202. Multiple cameras 120 can be used to capture multiple images of an operator (for example at different angles) for better operator recognition.

As shown in FIG. 3, another example of the operator console 110 is positioned on the desk 202 and includes the display screens 204a-204b and the ambient display 208. The operator console 110 in this example also includes multiple instances of the touchscreen 206, where each touchscreen 206 is associated with a different display screen 204a-204b.

The operator console 110 in this example also includes a mobile device 302. The mobile device 302 can be used to support interactions between an operator and HMIs presented on the display screens 204a-204b. For example, the mobile device 302 could include a touchscreen that can be used to control the content on the display screens 204a-204b and to interact with the HMIs presented on the display screens 204a-204b. Moreover, the mobile device 302 could receive and display information to an operator, such as current process variable values or process states, when the operator moves away from the operator console 110. The mobile device 302 includes any suitable device that is mobile and that supports interaction with an operator console, such as a tablet computer or smartphone.

The operator console 110 in this example further includes a desktop telephone 304 and one or more keyboards 306. The desktop telephone 304 could represent any suitable analog or digital telephone. Each keyboard 306 includes any suitable structure for providing physical keys that can be depressed by an operator.

In particular embodiments, a touchscreen 206 can be driven by a computing device (either within the touchscreen 206 or external to the touchscreen 206), and the display(s) 204a-204b could be driven by a separate computing device. This could provide a form of fault tolerance in an operator console 110. That is, if the computer driving the display(s) 204a-204b fails, the touchscreen 206 could still be used to maintain control over an industrial process (or vice versa). Note that a keyboard 306 could be provided in a hidden or other storage location that is accessible if and when the touchscreen 206 of an operator console 110 fails.

Also, in particular embodiments, an operator console 110 could be implemented using a modified form of the EXPERION HMI platform from HONEYWELL INTERNATIONAL INC. The modifications can include modifications enabling safe and reliable touch-based interaction with HMI displays and modifications enabling the movement of content between screens of a console.

The operator console 110 also includes one or more cameras 120 as disclosed herein. The one or more cameras can be embedded with the display screens 204a-204b, attached to a side or top of the display screens 204a-204b, placed on the desk 202, or on a stand next to the desk 202. Multiple cameras 120 can be used to capture multiple images of an operator (for example at different angles) for better operator recognition.

As shown in FIG. 4, an operator console 110 includes at least one processing device 402, which controls the overall operation of the operator console 110. For example, the processing device 402 may receive commands to display or change content on one or more display screens 204a-204b of the operator console 110. The processing device 402 may also control interactions with an external control system, such as by receiving commands related to retrieving process variable values or other content from the control system and changing process variable values or other content that is delivered to the control system. As noted above, the operator console 110 could include a separate computing device, and the processing device 402 could interact with the separate computing device to control or modify the contents on the one or more display screens 204a-204b. The processing device 402 includes any suitable structure for controlling the operation of an operator console 110. As particular examples, the processing device 402 could include one or more processors, microprocessors, microcontrollers, field programmable gate arrays, application specific integrated circuits, discrete logic devices, or other processing or control devices.

At least one memory 404 stores any of a wide variety of information used, collected, or generated by the touchscreen 206. For example, the memory 404 could store instructions executed by the processing device(s) 402, as well as data transmitted to or received from the operator console 110 and data received from an operator. The memory 404 includes any suitable volatile and/or non-volatile storage and retrieval device or devices.

At least one interface 406 supports interaction with external devices or systems, such as a computing device within the operator console 110 or an external control system. Each interface 406 includes any suitable structure supporting communications over physical or wireless paths. For example, a touchscreen 206 could include a wired USB, FIREWIRE, THUNDERBOLT, Ethernet, or other physical connection(s) to an operator console or other devices. A touchscreen 206 could also or alternatively include a wireless WIFI, BLUETOOTH, or other wireless connection to an operator console or other devices. Any number of interfaces 406 could be supported.

The operator console 110 further includes a display 408. The display can include a touchscreen. The display 408 represents a display for presenting text, images, or other data to an operator. The display 408 includes any suitable display, such as an LCD or LED display.

Depending on the implementation, the operator console 110 could include various other components, such as a microphone 410 and a speaker 412. The microphone 410 can be used to capture audio information, such as voice communications from an operator. The speaker 412 can be used to generate audio information, such as audible alarms or voice information received from another operator engaging in a voice communication session with the operator console 110.

An operator console 110 could support various other functions as needed or desired. For instance, the operator console 110 could be portable, and the processing device(s) 402 of the operator console could interact with the computing device coupled to the display screen(s) 204a-204b.

As discussed herein the operator console 110 also includes a camera 120 and an image verification unit 150. The camera 120 is configured to capture images of operators as discussed herein. The image verification unit 150 is configured to process captured images and determine if an operator captured in a captured image is an authorized operator. The image verification unit 150 is also configured to transmit an alarm to an alarm annunciation unit 160 when an unauthorized operator is attempted to access sensors or actuators through the operator console 110. The alarm annunciation unit 160 is configured to transmit an alarm through one or more areas of facility to notify security or facility managers of an attempted unauthorized access.

Although FIGS. 2 through 4 illustrate examples of operator consoles 110 and related details, various changes may be made to FIGS. 2 through 4. For example, an operator console 110 could have any combination of the features shown in FIGS. 2 and 3, such as when a feature shown in one figure is used in another figure. Also, various components in FIGS. 2 through 4 could be combined, subdivided, or omitted and additional components could be added according to particular needs. As a particular example, the processing device 402 could be implemented using a central processing unit (CPU) and a graphics processing unit (GPU). In addition, an operator console 110 could include any number of cameras.

Figure 5:
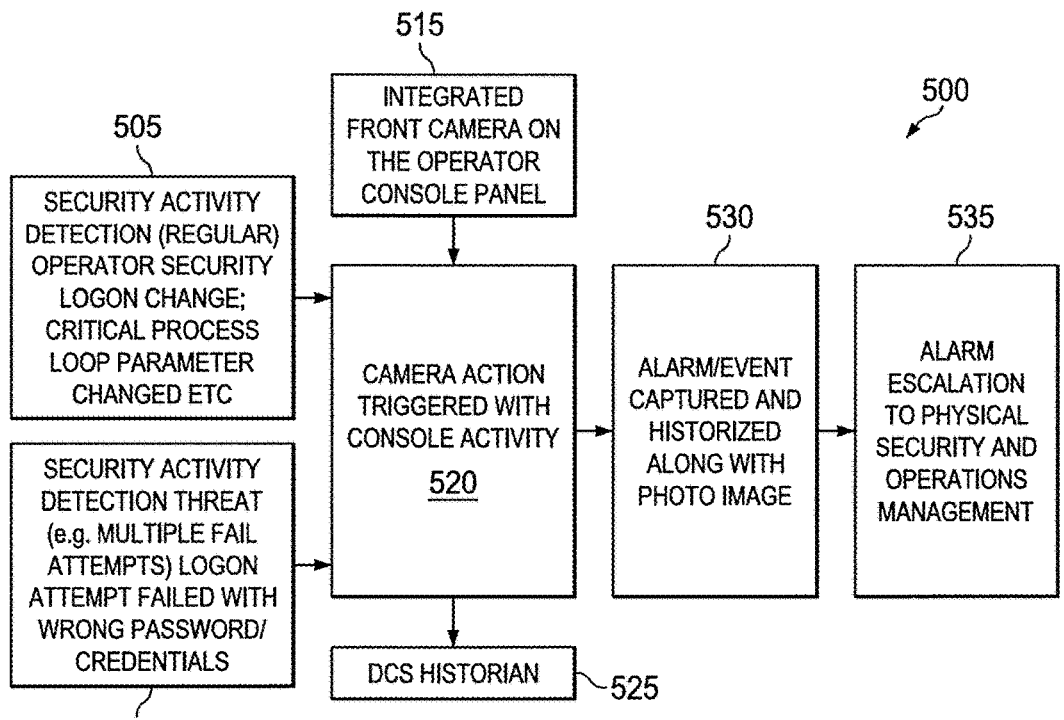
FIG. 5 illustrates an example automation system according to this disclosure.

FIG. 5 illustrates an example method 500 of image verification in an operator console according to this disclosure. For ease of explanation, the method 500 is described with respect to the operator consoles 110 shown in FIGS. 1 through 4. However, the method 500 could be used by any suitable operator console and in any suitable system.

The method 500 includes at block 505 a security activity detection step implemented during normal operation and at block 510 a security activity detection step implemented during threat operations. The security activity detection step implemented during normal operation provides an indication of user provided login credentials, an indication of a location of the operator console 110 receiving the login credentials, and identification of one or more other operator consoles that have over-riding access to the operator console receiving the login credentials. The security activity detection step implemented during threat operations provides an indication of provided unauthorized login credentials (such as failed login attempts). The indication of provided unauthorized login credentials can be provided after a predetermine number of consecutive unauthorized login credentials are provided.

As shown at block 515, an integrated camera at the operator console 110 can be used to capture an image of an operator in response to particular events as described herein and provided to the block 520. For example, an integrated camera at the operator console 110 can be used to capture an image of an operator in response to events associated with the security activity detection step implemented during normal operation at block 505 and events associated with the security activity detection step implemented during threat operations at block 510. An image (such as an authorized image or an unauthorized image as disclosed herein) can be captured by a camera and events associated with the security activity detection step implemented during normal operation at block 505 and events associated with the security activity detection step implemented during threat operations at block 510 can be correlated with the captured image at block 520 and stored in the DCS historian at block 525.

The block 520 after an image (such as an authorized image or an unauthorized image as disclosed herein) is captured by a camera and correlated with events associated with the security activity detection step implemented during normal operation at block 505 or with events associated with the security activity detection step implemented during threat operations at block 510, the correlation can trigger an alarm 530. The alarm can notify another operator console (such as a supervising operator console. Furthermore, if after a period of time, the other operating console does not response to the notifying alarm triggered at block 530, at block 535 the alarm can be escalated to higher supervising operator consoles, an entire area of a facility, or the entire facility.

Although FIG. 5 illustrates one example of a method 500 for combining visualization and interaction in an industrial operator console, various changes may be made to FIG. 5. For example, while shown as a series of steps, various steps in each figure could overlap, occur in parallel, occur in a different order, or occur any number of times.

Figure 6:
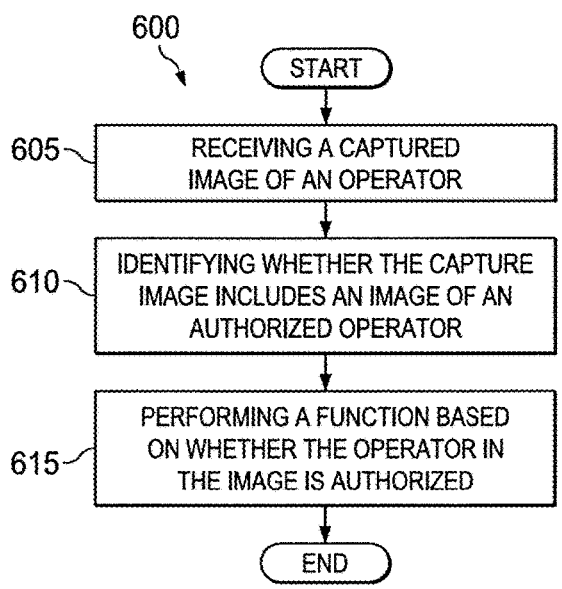
FIG. 6 illustrates an example method of image verification in an operator console according to this disclosure.

FIG. 6 illustrates an example method 600 of image verification in an operator console according to this disclosure. For ease of explanation, the method 600 is described with respect to the operator consoles 110 shown in FIGS. 1 through 4. However, the method 600 could be used by any suitable operator console and in any suitable system.

As shown in FIG. 6, the operator console 110 receives a captured image of an operator at the operator console at block 605. The captured image is received in response to detecting a user input provided to the operator console. The captured image is received in response to detecting that a predetermined amount of time has passed since a previous command was received. The captured image is received in response to detecting that login credentials are provided to the operator console.

The operator console 110 identifies whether the operator captured in the image is authorized to use the operator console at block 610. Identifying whether the operator captured in the image is authorized to use the operator console includes matching the captured image of the operator with an authorized image stored in a memory or matching the capture image with a received login credential. Identifying whether the operator captured in the image is authorized to use the operator console also includes matching the captured image of the operator with an authorized image of a particular security level. The operator console 110 performs a function based on whether the operator is authorized to use the operator console at block 615. If the operator captured in the image is authorized to use the operator console, then the function comprises permitting the operator to transmit a command to a sensor or an actuator using the operator console. If the operator captured in the image is not authorized to use the operator console, then the function comprises locking the operator console to prevent the operator from transmitting a command to a sensor or an actuator using the operator console.

Although FIG. 6 illustrates one example of a method 600 for combining visualization and interaction in an industrial operator console, various changes may be made to FIG. 6. For example, while shown as a series of steps, various steps in each figure could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a captured image of an operator at an operator console of an industrial process control and automation system;
identifying whether the operator captured in the image is authorized to use the operator console; and
performing a function based on whether the operator is authorized to use the operator console, wherein the function comprises, in response to determining that the operator captured in the image is not authorized:
activating an alarm; and
storing an identification of one or more commanded sensors or actuators of the industrial process control and automation system that correlate with a time the image was captured.

2. The method of claim 1, wherein the captured image is received in response to detecting a user input provided to the operator console.

3. The method of claim 1, wherein the captured image is received in response to detecting that a predetermined amount of time has passed since a previous command was received.

4. The method of claim 1, wherein the captured image is received in response to detecting that login credentials are provided to the operator console.

5. The method of claim 1, wherein identifying whether the operator captured in the image is authorized to use the operator console comprises matching the captured image of the operator with an authorized image stored in a memory or matching the captured image with a received login credential.

6. The method of claim 1, wherein identifying whether the operator captured in the image is authorized to use the operator console comprises matching the captured image of the operator with an authorized image of a particular security level.

7. The method of claim 1, wherein:
if the operator captured in the image is authorized to use the operator console, then the function comprises permitting the operator to transmit a command to a sensor or an actuator in the industrial process control and automation system using the operator console; and
if the operator captured in the image is not authorized to use the operator console, then the function further comprises locking the operator console to prevent the operator from transmitting the command to the sensor or the actuator in the industrial process control and automation system using the operator console.

8. An operator console comprising:
one or more cameras configured to capture an image of an operator at the operator console; and
an image verification unit comprising at least one processor or processing circuitry configured to:
identify whether the operator captured in the image is authorized to use the operator console in an industrial process control and automation system, and
perform a function based on whether the operator is authorized to use the operator console, wherein the function comprises, in response to determining that the operator captured in the image is not authorized:
activating an alarm; and
storing an identification of one or more commanded sensors or actuators of the industrial process control and automation system that correlate with a time the image was captured.

9. The operator console of claim 8, wherein the one or more cameras are configured to capture the image of the operator at the operator console in response to detecting a user input provided to the operator console.

10. The operator console of claim 8, wherein the one or more cameras are configured to capture the image of the operator at the operator console in response to detecting that a predetermined amount of time has passed since a previous command was received.

11. The operator console of claim 8, wherein the one or more cameras are configured to capture the image of the operator at the operator console in response to detecting that login credentials are provided to the operator console.

12. The operator console of claim 8, wherein the image verification unit is configured to identify whether the operator captured in the image is authorized to use the operator console by matching the captured image of the operator with an authorized image stored in a memory or by matching the captured image with a login credential received by the image verification unit.

13. The operator console of claim 8, wherein the image verification unit is configured to identify whether the operator captured in the image is authorized to use the operator console by matching the captured image of the operator with an authorized image of a particular security level.

14. The operator console of claim 8, wherein:
if the operator captured in the image is authorized to use the operator console, then the image verification unit is configured to permit the operator to transmit a command to a sensor or an actuator in the industrial process control and automation system using the operator console; and
if the operator captured in the image is not authorized to use the operator console, then the image verification unit is further configured to lock the operator console to prevent the operator from transmitting the command to the sensor or the actuator in the industrial process control and automation system using the operator console.

15. A non-transitory computer-readable medium comprising executable instructions that, when executed by processing circuitry, cause the processing circuitry to:
receive a captured image from a camera, wherein the captured image comprises an image of an operator at an operator console of an industrial process control and automation system;
identify whether the operator captured in the image is authorized to use the operator console; and
perform a function based on whether the operator is authorized to use the operator console, wherein the function comprises, in response to determining that the operator captured in the image is not authorized:
activating an alarm; and
storing an identification of one or more commanded sensors or actuators of the industrial process control and automation system that correlate with a time the image was captured.

16. The non-transitory computer-readable medium of claim 15, wherein:
if the operator captured in the image is authorized to use the operator console, then the executable instructions when executed cause the processing circuitry to permit the operator to transmit a command to a sensor or an actuator using the operator console; and
if the operator captured in the image is not authorized to use the operator console, then the executable instructions when executed cause the processing circuitry to transmit the alarm to another operator console.

17. The non-transitory computer-readable medium of claim 16, wherein if the operator captured in the image is not authorized to use the operator console, then the executable instructions when executed cause the processing circuitry to transmit the alarm to an alarm annunciation unit.

18. The non-transitory computer-readable medium of claim 15, wherein the executable instructions that when executed cause the processing circuitry to identify whether the operator captured in the image is authorized to use the operator console comprise executable instructions that when executed cause the processing circuitry to match the captured image of the operator with an authorized image stored in a memory.

19. The non-transitory computer-readable medium of claim 15, wherein the executable instructions that when executed cause the processing circuitry to identify whether the operator captured in the image is authorized to use the operator console comprise executable instructions that when executed cause the processing circuitry to match the captured image with a login credential.

20. The non-transitory computer-readable medium of claim 15, wherein the executable instructions that when executed cause the processing circuitry to identify whether the operator captured in the image is authorized to use the operator console comprise executable instructions that when executed cause the processing circuitry to match the captured image of the operator with an authorized image of a particular security level.

* * * * *